3,503,656
FLUID PRESSURE CONTROL VALVES
AND BRAKING APPARATUS

Charles F. B. Shattock, Oswald G. Shanks, Sydney A. Stevens, and Boguslaw W. Wojtecki, London, England, and Robert J. Dixon, Palos Verdes Peninsula, Calif., assignors to Westinghouse Brake and Signal Company Limited, London, England
Filed Dec. 12, 1966, Ser. No. 600,799
Claims priority, application Great Britain, Dec. 21, 1965, 54,066/65; Apr. 29, 1966, 18,817/66; May 18, 1966, 22,018/66; May 27, 1966, 23,776/66; July 8, 1966, 30,718/66; July 15, 1966, 31,868/66; July 20, 1966, 32,617/66
Int. Cl. B60t 8/22
U.S. Cl. 303—22                    17 Claims

ABSTRACT OF THE DISCLOSURE

A braking apparatus including an electro-pneumatic conversion device for converting an electric current representative of a desired braking effect into fluid pressure and means for applying this fluid pressure to the fluid pressure responsive braking device. The conversion device has a restricted flow inlet, an outlet and an exhaust port provided with a valve seat. A throttling element is movable towards and away from this valve seat to vary the throttling effect and thereby vary the pressure at the outlet port in proportion to the amount of throttling. A cantilever-mounted leaf-spring has its free end operatively engaging the throttling element. Loading means, operable in response to a pre-determined signal, controls the movement of the free end of the leaf-spring and hence the movement of the throttling element.

---

This invention relates to fluid-pressure control valves.

The present invention provides a fluid-pressure control valve having a restricted fluid flow inlet port, an outlet port, an exhaust port providing a valve seat, a throttling element movable towards and away from the valve seat thereby to effect a varying degree of throttling to the passage of fluid through the valve seat, a cantilever-mounted leaf-spring the free end of which is operatively engageable by the throttling element, and loading means by which the free end of the leaf-spring can be loaded such that, in operation of the valve, when a fluid pressure of predetermined value pertains at the inlet port, the value of the fluid-pressure pertaining at the outlet port is dependent upon the rate of escape of fluid through the valve seat which rate is in turn determined by the degree of throttling effected by the throttling element consequent upon the degree of loading of the leaf-spring by said means.

The exhaust port may be carried by a member which is movable towards and away from the free end of the leaf-spring to effect adjustment of the minimum throttling effected by the throttling element. The member may have therein a first conduit one end of which provides the valve seat, and transverse second conduits each communicating with the first conduit, one of the second conduits being in communication with the inlet port and the other of the second conduits being in communication with the outlet port, the member being axially movable within a bore in a body of the valve to effect said adjustment and the member being sealed with respect to the bore such as to prevent inter-communication of the three ports except by way of the first conduit. The arrangement may be such that the throttling element is urged by its weight in a direction tending to seat the element on the valve seat. The throttling element may conveniently be constituted by a ball. In this case, the leaf-spring may be provided adjacent its free end with a cup-shaped button which serves loosely to locate the element in position.

The loading means may be electro-magnetically operable. In this case, the loading means may include a permanent magnet and a co-operating armature coil. The permanent magnet may be fixedly located and the electro-magnet may be carried by the leaf-spring adjacent the free end thereof. In this arrangement, the electromagnet may be annular and may then be mounted co-axially with respect to the button when provided.

The inlet port may include a choke.

The inlet port may be arranged to be supplied with fluid under pressure via a pressure-limiting valve.

The outlet port may be connected to a relay valve the operation of which is controlled by the pressure pertaining at the outlet port. If the fluid-pressure control valve is used in a context in which for most of the time the value of the fluid-pressure pertaining at the outlet port is required to be substantially at atmospheric pressure, this will be achieved by having a minimum throttling effect at the valve seat such that there is thereby a continuous loss of fluid through the valve seat for so long as the fluid-pressure at the outlet port is substantially at atmospheric pressure. Such loss of fluid through the valve seat may be objectionable and in order to overcome this there may be provided in the fluid path to the inlet port, a further valve by which supply of fluid through the inlet port can be prevented.

The operation of the further valve may be so connected with the movement of the throttling element, that immediately upon movement of the throttling element towards the valve seat the further valve is operated to allow fluid pressure to pertain at the inlet port.

Where the means of the fluid-pressure control valve is electro-magnetically operable, said further valve may also be electro-magnetically operable. In this case, upon operation of the loading means the further valve may also be immediately operated to allow pressure to pertain at the inlet port.

There may also be provided a cut-off means by which the supply of fluid to the valve seat is prevented in the event of the pressure of the fluid which would otherwise be supplied to the valve seat being below a predetermined value.

Where as above described, the exhaust port is carried by a member movable towards and away from the free end of the leaf-spring to effect adjustment of the minimum throttling by the throttling element, the cut-off means may conveniently be embodied in the member. In such a case, the member may have therein a passage leading to the valve seat, passage closure means by which the passage may be sealed, and pressure-sensitive means operatively connected to the passage-closure means and subjectable to the pressure of the fluid supplied to the valve seat, the pressure-sensitive member being resiliently loaded in a direction to effect closure of the passage by the passage-closure means.

There may be provided supplementary loading means by which, independently of the first mentioned loading means, the free-end of the leaf-spring can be loaded in a similar manner to achieve a similar result as loading thereof by the first mentioned means achieves. The supplementary loading means may be resiliently biased to effect resilient loading of the leaf-spring and the supplementary loading means includes over-riding means by which the resilient bias is overcome normally to prevent the bias being effective. The over-riding means may be variably operative so as, at will, to be operative to a varying degree to counteract the resilient bias, and may comprise an electro-magnetic device which is energised to overcome the resilient bias.

This invention further relates to braking apparatus for tractor/trailer vehicles. The term "tractor/trailer vehicles" is herein to be understood to include both road vehicles having a tractor and a trailer and railway trains whether constituted by a locomotive (the tractor) and one or more un-motored rail vehicles or by a series of coupled motored vehicles.

The present invention further provides braking apparatus for a tractor/trailer vehicle, having controlling means which, upon a "break-away" of the trailer from the tractor, controls that part of the braking apparatus on the trailer to secure a degree of braking of the trailer which, irrespective of the weight of the trailer, will not result in excessive braking of the trailer.

A fluid-pressure control valve embodying supplementary loading means of a construction as is above described, is applicable as a control valve of the braking apparatus above described such a control valve being carried by the trailer of the vehicle. In this case, the controlling means of the braking apparatus may be constituted by the supplementary loading means in the control valve by which the free end of the leaf-spring can be resiliently loaded, the supplementary loading means normally being "held-off" so as to be not effective on the leaf-spring but is released to be effective on the leaf-spring in the event of a "break-away" so as to obtain thereby at the outlet port of the fluid-pressure control valve a maximum pressure or a pressure intermediate the minimum and maximum pressures obtainable at the outlet port by operation of the first-mentioned loading means of the fluid-pressure control valve.

Where the first-mentioned loading means of the fluid-pressure control valve is electro-magnetically operable, the supplementary loading means may also be electro-magnetically operable and, in this case, the supplementary loading means may be normally energised to be "held-off" from being effective on the cantilever-mounted leaf-spring by energisation of a wire passing between the tractor and the trailer, the arrangement being such that upon severance of this wire, the supplementary loading means is rendered effective on the cantilever-mounted leaf-spring to secure the degree of braking of the trailer specified.

With the provision of the fluid-pressure control valve as above described, the fluid-pressure at the outlet port may be effective to control the degree of braking effected on the trailer.

Additionally, this invention relates to braking apparatus and provides braking apparatus which includes an electro-pneumatic conversion device for converting an electric current, the magnitude of which is indicative of a desired degree of braking, into a fluid pressure, and means for applying said fluid pressure to fluid-pressure-responsive braking means.

The current, the magnitude of which is indicative of the degree of braking, may be derived via an electrical circuit from an alternating current output of a transductor, the magnitude of which alternating current is variable in accordance with that of an applied direct current control signal.

Alternatively, the current the magnitude of which is indicative of the degree of braking, may be derived from a voltage indicative of the degree of braking by applying such a voltage to a unity power factor Boucherot type of circuit to convert the voltage into current.

The device may be constituted by a fluid-pressure control valve as above described in which the loading means is electro-magnetically operable. In this case the magnetic field of the loading means may vary with the ampere turns thereof and shunting means may be provided responsive to the loaded condition of a vehicle to which the apparatus is fitted for shunting a variable proportion of the current to the coil in dependence upon the magnitude of the load.

The braking apparatus may have signal control means operable to produce an analogue electrical signal the value of which is dependent upon the degree of operation of the control means, load-measuring means by which the signal can be modified by an extent dependent upon the load value determined by the load measuring means to provide a signal for application to said device, the device being such that the latter signal is converted thereby into a fluid pressure output the value of which is dependent both on the degree of operation of the signal control means and the load value determined by the load measuring means, the fluid pressure output controlling the degree of operation of the braking means.

The load-measuring means may further include pneumatically operable means whereby, independently of the modulation of the signal, the fluid pressure output deliverable by the conversion device is limited to a maximum value dependent upon the load value.

The device may again be a fluid-pressure control valve as above described in which the means by which the free end of the leaf-spring of the valve can be resiliently loaded, is electro-magnetically operable and it is the modulated signal which is fed to the electro-magnetically operable means. Further, when the device is constituted by such a valve and the load-measuring means includes the above mentioned pneumatically-operable means, the pneumatically-operable means may be arranged such that the maximum value of the fluid pressure input to the converter is limited by the pneumatically-operable means in dependence upon the load value. Again, when the conversion device is constituted by a fluid-pressure control valve as above described in which the cut-off means is provided the cut-off means may include a cut-off valve and a selector valve which, dependent upon whether the supply to the device has been prevented or not, feeds the supply respectively either directly to pneumatic apparatus for controlling the operation of the braking means or to the device. Alternatively, in braking apparatus as above described including an electro-pneumatic conversion device for converting an electric current the magnitude of which is indicative of a desired degree of braking, into a fluid pressure, and means for applying said fluid pressure to fluid pressure responsive braking means, the means for applying said fluid pressure may include load-measuring means arranged to receive the output of the device and to produce a further fluid pressure output the value of which is dependent upon both the value of the output of the device and a load value determined by the measuring means, which further output is applied to the fluid-pressure responsive braking means.

Again, the device may be a fluid-pressure control valve as above described.

The load measuring means by which the signal from the signal control means as aforementioned may be modified dependent upon a load value includes a transductor to which the analogue signal is applied as a D.C. control signal a pressure indicative of the load being applied to a pressure transducer included in a feed back path of the transductor to modify the gain thereof in accordance with the load.

Further an electrical signal may be generated indicative of the degree of braking or the retardation being provided by dynamic braking of a vehicle and this may be compared with an electrical signal indicative of the overall degree of braking desired to produce said control signal such as to cause said fluid pressure to be such as to make up the discrepancy between said overall degree of braking and that produced by dynamic braking means.

The apparatus may furthermore include time constant means for ensuring no more than a predetermined rate of rise of electric current indicative of a desired degree of braking.

Embodiments of the present invention will now be described in greater detail, by way of example only with reference to the accompanying drawings, of which.

Figure 1:
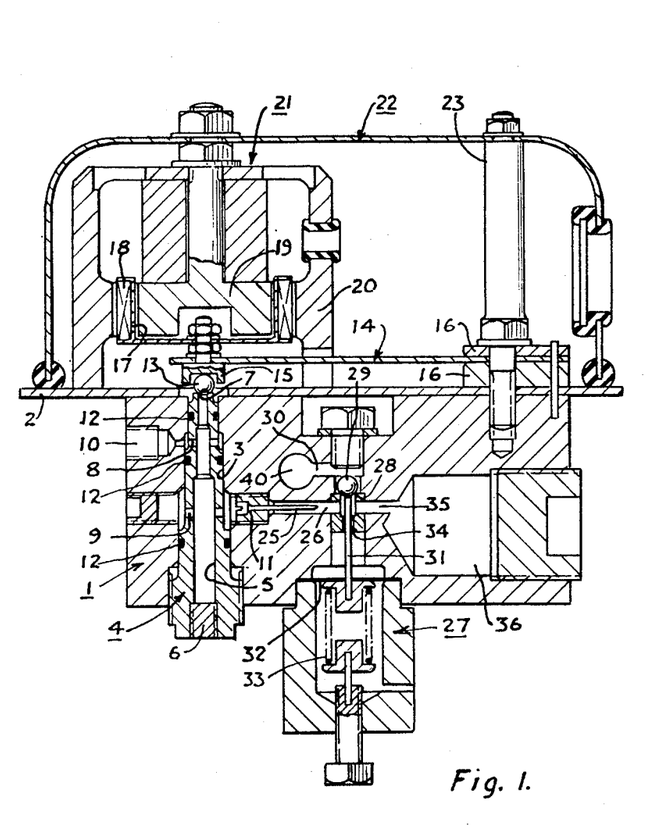
FIGURE 1 shows a cross-sectional view of a fluid pressure control valve.

Referring to FIGURE 1 of the drawings, the control valve comprises a valve body 1 secured to the under-side of a mounting plate 2.

The valve body 1 is provided with a stepped bore 3 within which is axially adjustable a member 4 having therein an axially-extending first conduit 5 sealed at its lower end 6 and providing at its upper end an exhaust port 7 constituting a valve seat. Extending transversely of the conduit 5 are two second conduits 8 and 9 respectively. The conduit 8 communicates with an outlet port 10 and the conduit 9 communicates with an inlet port 11. The member 4 is sealed with respect to the bore 3 by sealing means 12 effective to prevent inter-communication of the ports 7, 10 and 11 except by way of the first conduit 5.

Seated by its own weight on the exhaust port 7 is a throttling element 13 in the form of a ball.

The ball 13 is engageable with the free end of a cantilever-mounted leaf-spring 14, through an inversely mounted cup-shaped button 15 which serves loosely to locate the element 13 and which is carried adjacent the free end of the leaf-spring 14 which is clamped at its other end between mounting blocks 16 secured to the mounting plate 2.

Co-axially mounted with respect to the button 15 and carried by the leaf-spring 14 adjacent its free end thereof, is a light-weight former 17 encircled by an annular armature coil 18 lying between the inner pole 19 and the encircling outer pole 20 of a permanent magnet 21 fixedly located on an enclosing housing 22 secured to the mounting plate 2 by pillars (of which one only is shown) 23.

The inlet port 11 communicates through a choke 25 with an outlet port 26 of a pressure limiting valve 27. The pressure limiting valve 27 comprises a valve seat 28 into and out of engagement with which is a ball-shaped valve closure element 29 lying between the outlet port 26 and an inlet port 30. The valve closure element 29 is arranged for operation by a push rod 31 carried by a diaphragm 32 the under side of which is resiliently loaded by a spring 33 and to the top side of which is applied (through a passage 34 encircling the push rod 31) the pressure pertaining at the outlet port 26. The outlet port 26 is also connected through a conduit 35, with a chamber 36. The inlet port 30 is connected through a passage 40, to a source of supply of fluid under pressure. The above described control valve operates as follows:

With the passage 40 connected to a source of fluid under pressure, fluid pressure will build-up in the chamber 36 and at the outlet port 26 of the limiting valve 27 until this pressure reaches the limit determined by the setting of the valve 27. At this limit, the downward force on the diaphragm 32 exerted by the pressure of the fluid above the diaphragm 32, will balance the force exerted upwardly on the diaphragm 32 by the spring 33. It will be seen, therefore, that the valve 27 will be effective to control the degree of fluid pressure at the outlet 26 within fine limits.

From the outlet port 26 of the valve 27, fluid under pressure can flow through the choke 25 of the inlet port 11 through the second conduit 9 into the first conduit 5. From the first conduit 5, the fluid under pressure has two paths open to it. It can flow from the first conduit 5 through the second conduit 8 to the outlet port 10 and it can flow from the first conduit 5 through the exhaust port 7 past the throttling element 13. How much of the fluid in the conduit 5 will flow through the exhaust port 7 will depend upon to what degree the passage through the exhaust port 7 is throttled by the throttling element 13. Moreover, the pressure of the fluid at the outlet port 10 will depend upon at what rate fluid is exhausted through the exhaust port 7.

The rate at which fluid is exhausted through the exhaust port 7 will be dependent upon the balancing of the forces acting on the element 13.

Considering, firstly, the case when the coil 18 is de-energised, the forces acting downwardly on the element 13 will be, firstly, the weight of the element 13 and, secondly, the weight of the coil 18, the former 17, the button 15, and a part of the weight of the leaf-spring 14. However, from this second force must be substracted the restoring effort of the leaf-spring 14 tending to counteract the downward deflection of the leaf-spring 14 at its free end due to the weight of the coil 18, the former 17, the button 15, and that part of the weight of the leaf-spring 14. Acting upwardly in opposition to this summation of forces will be the force exerted on the element 13 by the pressure of the fluid passing through the port 7.

With the coil 18 de-energised, the member 4 can be set at an axial position in the bore 3 to provide an escape of fluid through the port 7 which is of such a rate that the pressure of fluid at the outlet port 10 is at the required minimum.

If, however, the coil 18 is now energised a further additional force (proportional to the degree of energisation of the coil 18) will be exerted downwardly on the element 13 due to the reaction between the electromagnetic effect resultant upon the energisation of the coil 18, and the effect of the permanent magnet 21. This additional downward force will tend to move the element 13 downwardly further to throttle the port 7. This increase in throttling of the port 7 will, on the one hand, reduce the rate at which fluid is exhausted through the port 7 and, on the other hand, increase the pressure of this exhausting fluid. Increased throttling of the port 7 will continue until once again, there is a balance of forces on the element 13 and this increased throttling of the port 7 will increase the pressure at the outlet port 10.

By suitable choice of proportions between the stiffness of the leaf spring 14, the diameter of the ball-element 13 and the diameter of the exhaust port 7, it is possible to obtain (within very close limits) a linear relationship between the current in the coil 18 and the pressure at the outlet port 10.

Theoretically, however much the clearance between the element 13 and the port 7 is increased, the pressure in the outlet port 10 can never be zero. To avoid the necessity of having a large clearance (and consequent possible deviation from linearity of the pressure at the outlet port 10 with respect to the current flowing in the coil 18) it is desirable that the minimum pressure at the outlet port 10 should be about 3 lbs. per sq. inch. As has been explained, this minimum pressure is determined by the axial setting of the member 4 in the bore 3.

Although, as has been stated above, it is theoretically possible to obtain a practicaly linear relationship between the current flowing in the coil 18 and the pressure at the outlet port 10, production variations between different valves may result in slightly differing characteristics between the valves. These differing characteristics may arise from any one or more of the following:

(a) the coil winding 18 may not be identical from one valve to another.
(b) the magnetic flux between the poles of the permanent magnet 21 may not be the same between valves.
(c) the diameter of the port 7 may vary within manufacturing tolerances.
(d) temperature variations within the coil 18 due either to the fact of current passing through the coil 18 or a change in ambient temperature conditions.

Non-linearity arising from (a), (b) and (c) can be corrected by the addition of a trimmer resistance across the coil 18 and non-linearity (due to (d)) above can be corrected by embodying a thermistor in the coil winding 18.

It will be appreciated that the volume output from the outlet 10 is, of course, very small but if the outlet port 10 is connected to the control chamber of a relay valve, a large output can be obtained from the relay valve. Conveniently, the relay valve can be made integral with the above described control valve.

The means by which the free end of the leaf-spring 14 can be loaded to a varying degree in the above described embodiment, has been shown as electromagnetically operated but alternative resilient forms of operating these means could be provided. For example, the loading on the leaf-spring 14 could be provided by a hand or foot lever compressing a spring one end of which was engaged by the lever and the other end of which bore against the leaf-spring 14.

In the above described embodiment, an increase of pressure at the outlet port 10 is consequent upon an increase in current in the coil 18. However, conversely, the arrangement may be such that an increase in pressure at the outlet port 10 is consequent upon a fall in current in the coil 18.

The control valve specifically described and illustrated in FIGURE 1 is so arranged that the coil 18 is normally de-energised and that there is normally through the seat 7, a maximum escape of fluid due to the minimum throttling effect of the throttling element 13, so as to result in a minimum pressure at the outlet port 10; energisation of the coil 18 increasing the throttling effect of the throttling element 13 to increase the pressure at the outlet port 10. Hence, in the "normal" condition of the valve there is a "maximum" loss of fluid through the seat 7.

To obviate this disadvantage there may be provided in the passage 40 a further valve by which the presence of fluid-pressure at the inlet port 11 from a reservoir, is prevented or permitted in accordance with the operation of the further valve.

The further valve of the present invention may also be electro-magnetically operated and may, in its "energised" condition, be arranged to prevent the supply of fluid-pressure from a reservoir to the inlet port 11, energisation of the further valve causing the valve to open to permit fluid-pressure to pertain at the inlet port 11. In this case, the control circuits of said further valve and the coil 18 may be so interlocked that operation of a common operating member to commence energisation of the coil 18 immediately causes energisation of said further valve so that it is thereby operated to permit fluid-pressure to pertain at the inlet port 11 ready for control by the throttling effect of the throttling member 13 in dependence upon the degree of energisation of the coil 18.

However, if the control valve is so arranged that minimum pressure at the outlet port 10 achieved by minimum throttling of the throttling element 13 arises from maximum energisation of the coil 18, the control circuit of the electro-magnetic further valve may be so interconnected with the control circuit of the coil 18 that when the coil 18 was energised to the maximum extent, the further valve is also operated to close the communication between a reservoir and the inlet port 11 such as thereby to prevent any pressure obtaining at the inlet port 11. In this case, of course, commencement to de-energise the coil 18 would immediately cause reverse operation of said further valve such that it was thereby opened to permit pressure to obtain at the inlet port 11.

Figure 2:
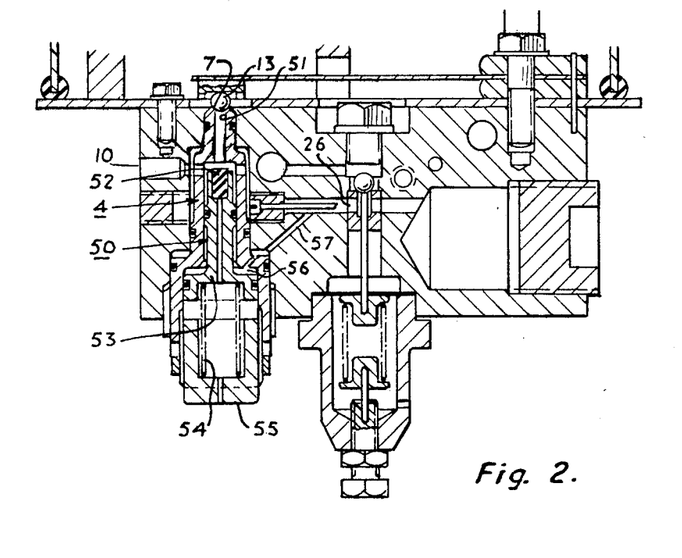
FIGURE 2 shows a cross-sectional view of the relevant parts of a modification of the valve shown in FIGURE 1.

Referring to FIGURE 2 of the drawings, in which like references are used for like parts of the valve described with reference to and illustrated in FIGURE 1 of the drawings cut-off means 50 is shown embodied in the member 4 of the valve. The member 4 has at its upper end (as viewed in the drawing) a passage 51 which communicates at its upper end with the exhaust port 7 against which is seatable the ball 13. At its lower end, the passage 51 is closable by a passage-closure member 52 of resilient material carried by a piston 53 slidable within the member 4. The piston 53 is resiliently loaded by a spring 54 which urges the piston 53 upwardly to urge the passage-closure member 52 in a direction to close the passage 51. As can be seen, the spring 54 extents between the piston 53 and a cap 55 which is screwed into the bottom of the member 4 so that by screwing the cap 55 inwardly and outwardly of the member 4, the degree of compression of the spring 54 can be adjusted to vary the loading of the piston 53.

Above the piston 53 and inside the member 4 is a chamber 56 which communicates with the inlet port 26 through a by-pass conduit 57.

The operation of a valve modified by the provision of the present invention is identical to that of the valve of FIGURE 1 so long as the pressure of the fluid supply to the passage 51 is of the desired value (which is determined by the degree of compression of the spring 54) for, in this case, the pressure of this supply (which will be applied in the chamber 56) will maintain the piston 53 and the passage-closure member 52 in the position shown in the drawing, to permit the normal operation of the valve.

However, should the pressure of the fluid supply drop below a predetermined value, then the force this pressure will exert on the piston 53 will be overcome by the force exerted by the spring 54 which will, therefore, move the piston 53 upwardly to move the passage-closure member 52 into engagement with the lower end of the passage 51 and thereby seal the passage 51 and prevent the flow of air through the valve seat 7 and thus of any further depletion of the fluid supply pressure.

Figure 3:
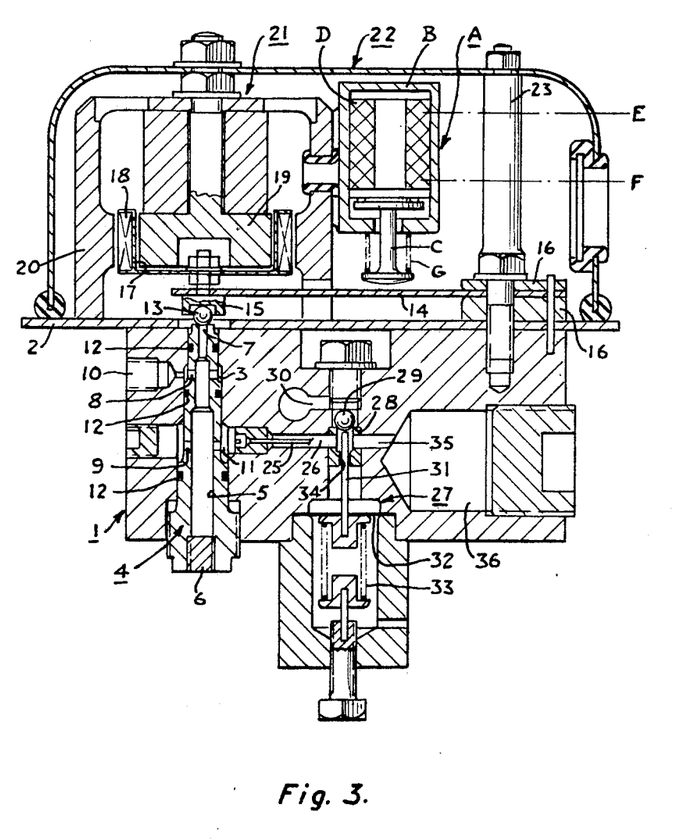
FIGURE 3 shows a cross-sectional view of a further modification of the valve of FIGURE 1, FIGURES 4 and 5 show diagrammatic representations of alternative systems embodying the valve of FIGURE 3, FIGURES 6–11 show various braking systems embodying the valve of FIGURE 1.

Turning now to FIGURE 3 of the accompanying drawings, there is here illustrated a valve which is identical to that of FIGURE 1 (again, like references indicating like parts) save that the valve of FIGURE 3 is provided with supplementary loading means A which (as will hereinafter be described) upon a "break-away" of a trailer from a tractor controls the braking apparatus on the trailer to secure a braking effort, irrespective of the weight of the trailer, will result in no more than a predetermined degree of braking of the trailer. According to the application, this may be the maximum pressure or a pressure intermediate the minimum and maximum pressures obtainable at the outlet port by operation of the first mentioned loading means.

The means A comprises an electro-magnet B having an armature C which, when current is flowing in the coil D of the electro-magnet B (through wires E and F) hold the armature C against the effort of a spring G, from engagement with the leaf-spring 14. The coil D is normally energised from the tractor so that the means A is not normally effective.

However, in the event of a "break-away" of the trailer, not only will coil 18 be de-energised but so also will be the coil D. In this event, the spring G will be effective to move the armature C into engagement with the leaf-spring 14 and thereby to exert through the armature C a resilient loading on the leaf-spring 14 which, in the same manner as the previously described resilient loading effected by the coil 18, will (by varying the throttling effect of the ball 13 on the exahust valve seat 7) effect a predetermined fluid pressure at the outlet port 10.

By suitable choice of the value of the spring G and the position of the means A along the length of the leaf-spring 14, the value of the output pressure at the output port 10 can be chosen to be a desired value. In accordance with the present invention, the value so chosen will be such as to result in a degree of braking which is somewhat less than the maximum degree of braking normally obtainable on the trailer.

In an alternative or normally energised arrangement of the control valve, in which removal of a signal to 18 gives rise to maximum throttling, removal of the energisation of D due to a break-away can be arranged to so load the spring 14 that maximum or less than maximum throttling is produced by ball 13 to hold the braking effort to a safe value even for an unloaded trailer.

Figure 4:
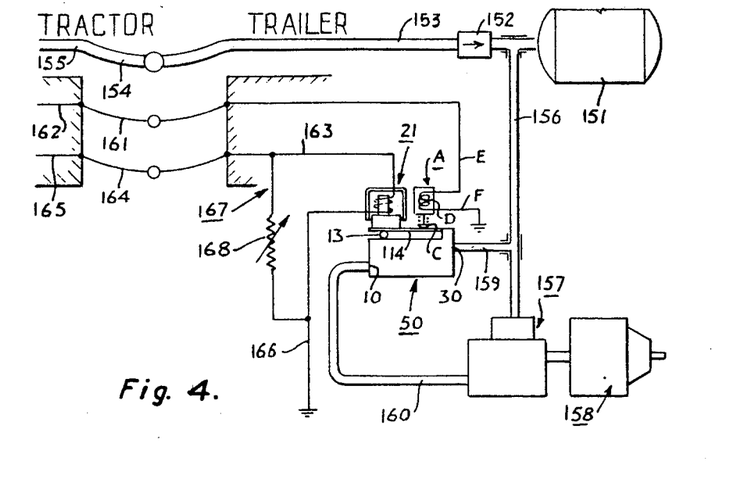

Turning now to FIGURE 4, there is here shown a braking system incorporating the valve of FIGURE 3, the valve being indicated by the reference 150 and the various parts of the valve shown in FIGURE 4 being indicated by like references for like parts of the valve shown in FIGURE 3.

In FIGURE 4 there is shown only the trailer braking system which comprises a trailer reservoir 151 arranged to be charged through a one-way valve 152 from a pipe 153 connected by a flexible coupling 154 to a charging pipe 155 carried by the tractor.

Leading from the trailer reservoir 151 is a pipe 156 leading to a relay valve 157, the output of which is connected to a brake cylinder 158, the pipe 156 having a branch connection 159 connected to the inlet port 30 of the valve 150. The outlet port then of the valve 150 is connected to the relay valve 157 by a pipe 160.

The wire F is connected to earth and the wire E, through a suitable electrical connection 161 is connected to a corresponding wire 162 on the tractor.

The coil 18 of the valve 150 is arranged to be energised over a wire 163 which is also connected through a suitable coupling 164 to a wire 165 on the tractor. The other side of the coil 18 is connected by a wire 166 to earth, the coil 18 being paralleled by a shunt 167 which incorporates a variable resistor 168, the resistance of which can be varied in dependence upon the weight of the trailer.

In normal operation, the reservoir 151, having been charged over the pipe 155, the coupling 154, the pipe 153 and the one-way valve 152, the trailer brakes are operated by energisation of the tractor wire 165 which, through the coupling 164 and the wire 163, energises the coil 18. The degree of energisation of the coil 18 will depend, on the one hand, on the degree of energisation of the wire 165 and, on the other hand, on the setting of the resistance 168. As explained above, the pressure at the output 10 of the valve 150 will be dependent upon the degree of energisation of the coil 18 and the pressure at the output 10 is applied over the pipe 160 to the relay valve 157 to permit air under pressure to flow from the reservoir 151 to the brake cylinder 158 such that there is generated in the brake cylinder 158 a pressure which is dependent upon the pressure at the output. During this operation, the wire 162 on the tractor will have continued to be energised so that by the resultant energisation of the coil D of the means A, the armature C will be held out of engagement with the leaf-spring 14 of the valve 150.

If, however, the trailer should break away from the tractor, the two wires 161 and 164 will be broken and likewise will be the flexible coupling 154. Breaking of the coupling 154 will not, of course, affect the pressure in the reservoir 151 which will be protected by the one-way valve 152.

By reason of the breaking of the wire, 164, it will no longer be possible over this wire to control the current in the coil 18 so that, but for the provision of the means A, the valve 150 could not be operated to apply the brakes of the trailer. However, breaking of the coupling 161 will result inevitably in the de-energisation of the wire E on the trailer and such de-energisation will consequently cause de-energisation of the coil D. Resulting from this de-energisation as above explained, the armature C will be caused to exert a resilient loading on the leaf-spring 14 by reason of its spring G so that the brakes of the trailer will be operated by fluid pressure applied to the port 30 of the valve 150 to apply at the outlet port 10 thereof a pressure which will be applied over the pipe 160 to the relay valve 157 operation of which will cause a fluid pressure to be applied to the brake cylinder 158 from the reservoir 151. As above explained, the arrangement of the means A is such that the degree of pressurisation of the brake cylinder 158 will be less than that to which the brake cylinder 158 would be pressurised to obtain a maximum degree of braking.

Preferably the arrangement of means A will be chosen such that the degree of braking effected in the event of a "break-away" will be that which would normally be used to obtain full braking of an empty trailer.

Figure 5:
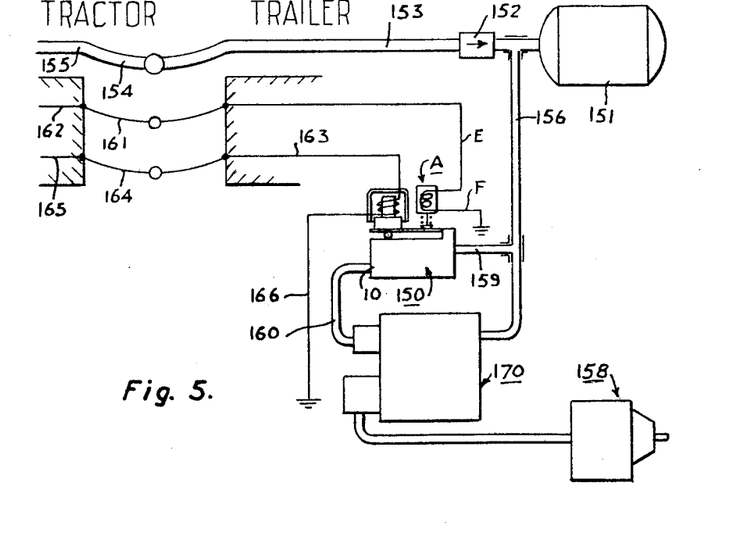

Turning now to FIGURE 5, in which like parts to those in FIGURE 4 are indicated by like references, the apparatus here shown differs from that in FIGURE 4 in that the variable load shunt 167 has been omitted and the relay valve 157 is replaced by a variable load valve 170 which effects the operation (that of weight control of the degree of braking) carried out in FIGURE 4 by the shunt 167. In this case, in the event of a "break-away" the means A can be arranged such as to produce at the output 10 a pressure which would correspond to a degree of braking greater than that which would be provided by the arrangement in FIGURE 4, for in the present arrangement the variable load valve 170 will ensure that an excessive degree of braking is not applied in the event of the trailer being empty.

An alternative in the FIGURE 4 apparatus, if the trailer carries a local supply of current, is that the device A could be omitted in favour of a relay with change-over contacts to connect the coil 18 (together with the load variable shunt 167) when this relay is de-energised. With such an arrangement, in the event of a "break-away" the degree of braking applied would be in dependence upon the weight of the vehicle. The arrangement would then be made to be such that the "emergency" braking would occur also in the event of a power supply upon an "emergency" switch in, say, the brake controller on the tractor being broken.

Figure 6:
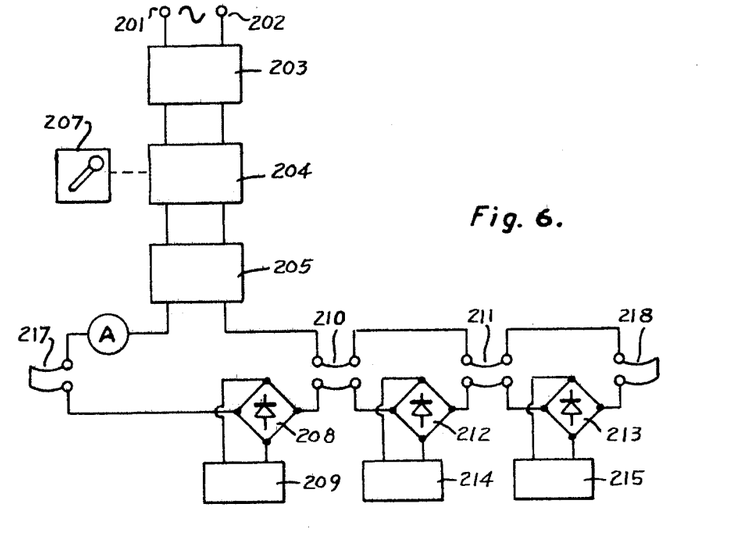

FIGURE 6 shows braking apparatus employed on a train which is driven from an A.C. traction supply and this supply is made available, not only for traction purposes but also, to the braking apparatus. By way of example, moreover, it is assumed that in addition to the leading coach carrying the driver control position on a train, there are two additional coaches and all coaches are required to be braked equally by the braking apparatus. The aforementioned A.C. supply is made available at the supply input terminals 201 and 202 of apparatus in the leading coach and these are connected to a voltage stabilising circuit of any suitable known form, indicated by the block reference 203 in the drawing. The output from the voltage stabiliser is applied to a variable ratio transformer 204 which is also of well known form and the variable voltage output of this transformer is connected to the input of a unity power factor Boucherot circuit 205 to convert the applied voltage into an output current, the magnitude of which is substantially independent of the loading on the circuit. As is well known in rail vehicle practice, the driver of the train is provided with a brake handle, the position of which determines the braking effort to be applied to all braked axles on the train. In this case, the driver's brake handle 207 is mechanically coupled via a coupling indicated by the dotted line 206 to the control mechanism of the variable ratio transformer and therefore the transformation ratio of the transformer is determined by the position of the brake handle. The variable output current of the Boucherot circuit 205 is connected via an ammeter A to a bridge rectifier in the braking circuit of the leading coach of the train, this bridge rectifier being indicated by the reference 208. The D.C. output of the bridge rectifier 208 is applied to a suitable electro-pneumatic conversion device which is assumed to be of a type such as described in the foregoing with reference to FIGURE 1. By this means, the current in the energising coil of the conversion device 209 is converted into a pneumatic pressure for application to the braking means which is provided on the leading coach.

It will be seen that for the purposes of braking the remaining coaches of the train, there are provided in series with the bridge rectifier 208 via suitable intercoach couplings such as 210 and 211, further bridge rectifiers such as 212 and 213 on the remaining coaches. These bridge rectifiers have their D.C. outputs connected to the operating coils of electro-pneumatic conversion devices which are substantially identical with the electro-pneumatic conversion device 209, and indicated by references 214 and 215. By providing suitable dummy couplings such as 217 and 218 at the front and rear ends of the train, it will be seen that the A.C. output derived from the circuit 205 is applied in series to all the bridge rectifiers, 208, 212 and 213 and thereby the coils of the devices 209, 214 and 215 are all effectively connected in series for the application of D.C. from the various bridge rectifiers. It will be appreciated, therefore, that the current passing through each of these devices is the same and assuming correct calibration of the devices, the output pressures derived therefrom may be identical.

For the driver's convenience, the ammeter may be provided in the A.C. circuit at the driving position in order that the driver may see that the variable ratio transformer is performing correctly and producing an appropriate alternating current dependent upon the position of the brake handle 207. If desired, moreover, where a guard's position is provided at the rear of the train, an ammeter may be connected at the guard's position to show on making a test brake application before the commencement of a journey, that the couplings 210 and 211 are correctly made and that no short circuit has occurred at a point along the train which could give rise to no braking rearward of such a short circuit.

Figure 7:
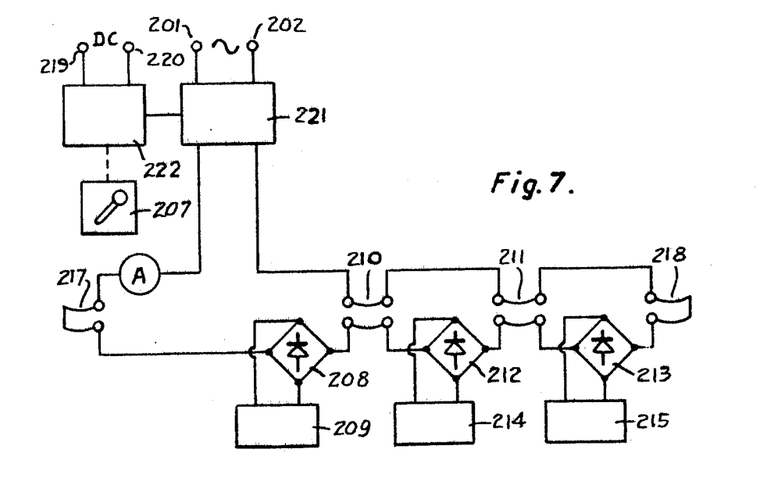

Referring now to FIGURE 7, it will be appreciated that the combination of voltage stabilising circuit, voltage ratio transformer and Boucherot circuit, as employed in the arrangement of FIGURE 6, may be undesirably expensive and accordingly it is proposed in the arrangement of FIGURE 7 to employ a transductor 221 which draws its alternating current supply directly from the traction supply at terminals 201 and 202 but since the transductor is a voltage regulating device, the supply does not require to be stabilised. A direct current supply for the transductor is derived from the local battery supply which is available on most rail vehicles and the magnitude of the D.C. applied to the transductor is regulated via a mechanical coupling from the driver's brake handle 207 to a rheostat represented by reference 222 in the drawing. The remainder of the arrangement taken from the variable output of the tranductor 221, is substantially the same as that following the Boucherot circuit 205 of FIGURE 6 and will not be described further in detail.

Again, in operation of the arrangement of FIGURE 7, movement of the driver's brake handle towards a brake application position varies the magnitude of direct current applied to the transductor and thereby the magnitude of current applied to the braking circuits of the vehicles which are again effectively in series.

It will be appreciated that by virtue of the use of a current analogue control of the braking, it is possible to provide electro-pneumatic braking apparatus which, always provided that the requisite dummy couplings are connected, is substantially independent in operation of the number of coaches which are connected to or disconnected from the train. This is because both the Boucherot circuit of FIGURE 6 and the transductor of FIGURE 7 are arranged to be capable of transmitting a current which is dependent on the brake handle position but is substantially independent of the loading on the circuit.

It will be appreciated that in modern rail braking practice, it is desirable to provide in the apparatus of FIGURE 6 or 7, for empty load or variable load braking compensation and for the purposes of achieving this, each coach or each axle may be provided with means for sensing the instantaneous loading and thereby as mentioned previously providing a variable shunt across the operating coil of the respective electro-pneumatic conversion device which is used for converting the current into a corresponding pneumatic pressure. In this way, by providing a conversion device for each axle or bogie which is braked, it is possible to provide, not only for variable load compensation, but also for load transfer which occurs during braking.

It will be appreciated that apparatus as described in the foregoing may be employed as a normally energised system, that is, in a system where a predetermined current in the train circuit gives rise to the brakes being released and subsequent reduction of the current towards zero value gives rise to the application of the brakes. This may be extended for use in a train controlled under automatic train operation conditions in which the current supplied down the train is increased towards the predetermined value to release the brakes and further increase of the current gives rise to control of the motors on the train for the purposes of controlling the speed of the train in accordance with the thus increased current. In this case the braking signal can be introduced into the control circuits, by passing the driver's brake valve by an automatic transmission and detector device.

Alternatively, the system may be a normally de-energised system in which zero current gives rise to zero braking and increase of the current towards a predetermined level gives rise to a brake application. Further, in a train operating under automatic control conditions, the brakes may if desired be arranged to be released at a predetermined intermediate current value, reduction of the current from this value giving rise to an increase of train speed and increase of current from this value giving rise to braking. It will be appreciated, however, that the safer of the arrangements is one where braking is initiated when the current is reduced from a predetermined value towards zero as this provides for safe operation in the event of a breakaway which causes open circuit conditions to pertain and thereby interrupts the current through the conversion devices of all the vehicles on the train.

Again, although not essential in the arrangements of FIGURES 6 and 7 described in the foregoing, where a reduction of current normally gives rise to a reduction in braking, it is desirable to provide a magnet valve at the driving position for the purpose of opening an air discharge path to the driver's brake valve to cause an automatic brake application in the event of the A.C. supply failing. It may moreover be arranged that contacts are provided in the circuit to this magnet valve to open in the release position of the valve to permit a feeding path for air from the driver's brake valve to the relay valve when the driver's brake valve is in release position.

Figure 8:
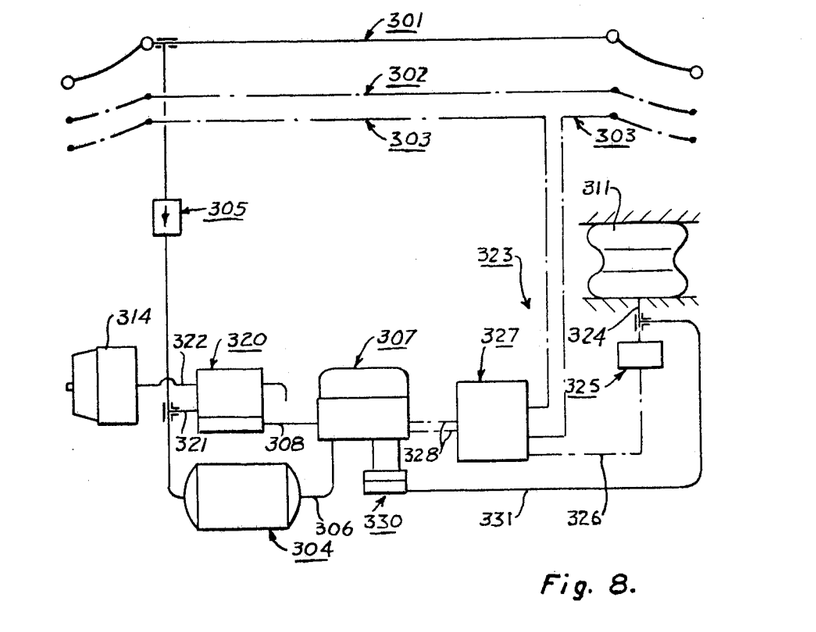
Figure 9:
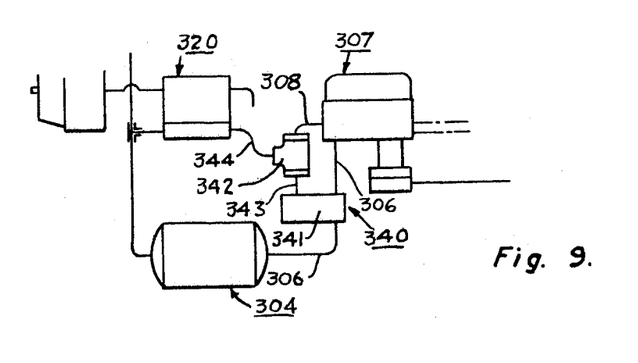
Figure 10:
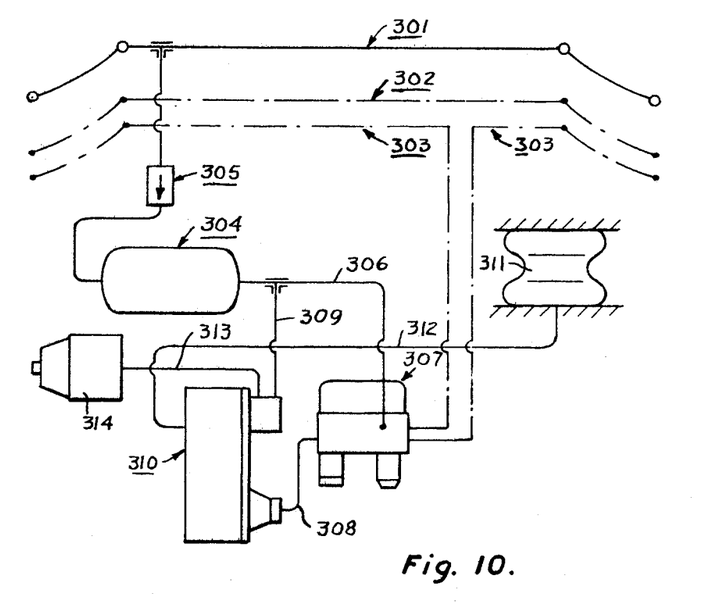
Figure 11:
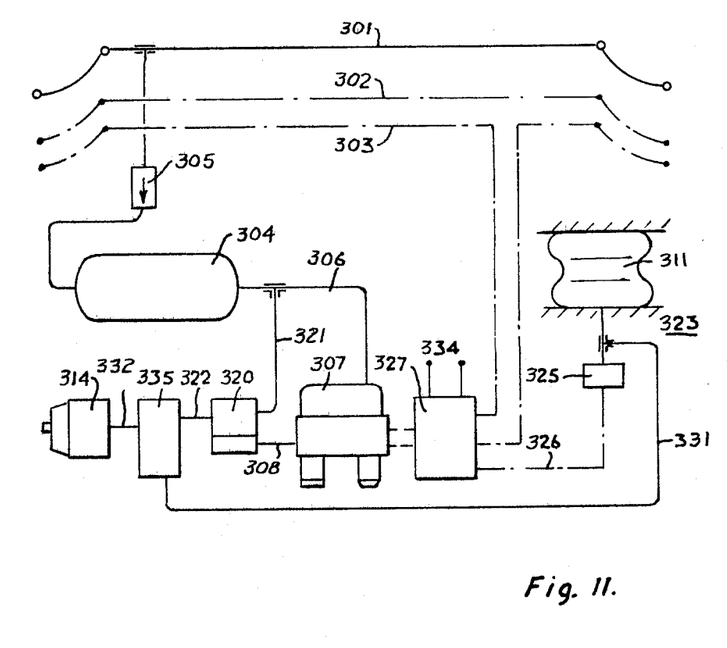

Further, should the A.C. supply fail momentarily during a brake application and recover again during the same application the system having changed to an automatic application as mentioned above, means may be provided to ensure that the system does not change back to electrocluded, namely in FIGURES 8, 9 and 11, the concept of "continuous blending" whereby the dynamic braking is continuously made up where necessary by the electro-pneumatic braking this is equally applicable to the other systems but the blending box in these systems will not require the facilities involving the pressure transducer as in these systems it is pressures and not electrical signals which are modified to provide the adjustment of braking pressure in response to the load measuring means.

In each of the circuits envisaged in the foregoing and involving a so called blending box, means may be provided therein for providing a delayed rise of control current in response to a rapid operation of the driver's brake handle of a train or in response to a rapid command of braking from an automatic train control system. This may be achieved in suitable manner by a time constant circuit either in the apparatus which supplies the control current to the braking apparatus over the wire 164 or wires 302 and 303 as the case may be in the above described systems, or alternatively by providing individual time constant circuits at each of the blending boxes in a vehicle or train of vehicles.

Having thus described our invention what we claim is:

1. Braking apparatus including an electro-pneumatic conversion device for converting an electric current, the magnitude of which is indicative of a desired degree of braking, into a fluid pressure, and means for applying said fluid pressure to fluid-pressure-responsive braking means, said conversion device having a restricted fluid flow inlet port, an outlet port, an exhaust port providing a valve seat, a throttling element movable towards and away from the valve seat thereby to effect a varying degree of throttling to the passage of fluid through the valve seat, a cantilever-mounted leaf spring the free end of which is operatively engageable by the throttling element and loading means by which the free end of the leaf-spring can be loaded such that in operation of the valve, when a fluid pressure of predetermined value pertains at the inlet port, the value of the fluid-pressure pertaining at the outlet port is dependent upon the rate of escape of fluid through the valve seat which rate is in turn determined by the degree of throttling effected by the throttling element consequent upon the degree of loading of the leaf-spring by said loading means.

2. Apparatus as claimed in claim 1, including means for deriving a current, the magnitude of which is indicative of the degree of braking, via an electrical circuit from an alternating current output of a transductor, the magnitude of which alternating current is variable in accordance with that of an applied direct current control signal.

3. Apparatus as claimed in claim 1 including means for deriving a current, the magnitude of which is indicative of the degree of braking, from a voltage indicative of the degree of braking by applying such a voltage to a unity power factor Boucherot type of circuit to convert the voltage into current.

4. Apparatus as claimed in claim 1 wherein the means for applying said fluid pressure includes load-measuring means arranged to receive the output of the conversion device and to produce a further fluid pressure output the value of which is dependent upon both the value of the output of the device and a load value determined by the measuring means, and means for applying the said further output to the fluid-pressure-responsive braking means.

5. Apparatus as claimed in claim 4, wherein said load-measuring means derives a load value as a fluid pressure from a fluid operated part of the suspension of a vehicle to which the apparatus is fitted.

6. Apparatus as claimed in claim 5 wherein the apparatus has signal control means operable to produce an analogue electrical signal, the value of which is dependent upon the degree of operation of the signal control means, and wherein the load measuring means includes means for modifying the said signal to an extent dependent upon a load value including a transductor to which the analogue electrical signal is applied as a D.C. control signal, and means for applying a pressure, indicative of the load to a pressure transducer included in a feedback path of the transductor to modify the gain thereof in accordance with the load.

7. Apparatus as claimed in claim 6, including means for generating an electric current, the magnitude of which is indicative of the desired degree of braking by means responsive to an electrical signal indicative of an overall degree of retardation, and means for generating an electrical signal indicative of the degree of braking on the retardation by dynamic braking means to cause said fluid pressure to be such as to make up the discrepancy between the said overall degree of retardation and that produced by the dynamic braking means.

8. Apparatus as claimed in claim 7 including time constant means for ensuring no more than a predetermined rate of rise of said electric current which is indicative of the desired degree of braking.

9. An apparatus as claimed in claim 1, wherein the exhaust port is carried by a member which is movable towards and away from the free end of the leaf-spring to effect adjustment of the minimum throttling effected by the throttling element.

10. Apparatus as claimed in claim 9 wherein the means for applying said fluid pressure includes load-measuring means arranged to receive the output of the conversion device and to produce a further fluid-pressure output, the value of which is dependent upon both the value of the output of the device and a load value determined by the measuring means, and means for applying the said further output to the fluid-pressure-responsive braking means.

11. Apparatus as claimed in claim 9, wherein the force exerted by the loading means varies with the ampere turns of a coil thereof and shunting means is provided responsive to the loaded condition of a vehicle to which the apparatus is fitted for shunting a variable proportion of the current to the coil in dependence upon the magnitude of the load.

12. Apparatus as claimed in claim 9, wherein the apparatus has signal control means operable to produce an analogue electrical signal the value of which is dependent upon the degree of operation of the signal control means, load-measuring means by which the signal can be modified to an extent dependent upon a load value determined by a load-measuring means, to provide a signal for application to said device, the device being such that the latter signal is converted thereby into a fluid pressure output the value of which is dependent both on the degree of operation of the signal control means and the load value determined by the load measuring means, the fluid pressure output controlling the degree of operation of the braking means.

13. Apparatus as claimed in claim 12, wherein the load-measuring means further includes pneumatically operable means whereby, independently of the modification of the signal, the fluid pressure output deliverable by the conversion device is limited to a maximum value dependent upon the load value prior to application to the braking means.

14. Apparatus as claimed in claim 13 wherein means for limiting the output pressure deliverable by the conversion device includes a limiting valve having a fast blow-down facility and being operable to provide wheel slip control.

15. Apparatus as claimed in claim 12, wherein the load signal is an electro-magnetically operable means and said latter signal being fed to the electro-magnetically operable means.

16. Apparatus as claimed in claim 15, the load measuring means including pneumatically operable means arranged such that the maximum value of the fluid pressure input to the converter is limited by the pneumatically-operable means in dependence upon the load value.

17. Apparatus as claimed in claim 15 including a cut-off means embodied in the member and wherein the cut-off means includes a cut-off valve and a selector valve which, dependent upon whether the supply to the device has been prevented or not, feeds the supply respectively either directly to pneumatic apparatus for controlling the operation of the braking means or to the said conversion device.

References Cited

UNITED STATES PATENTS

| | | | |
|---|---|---|---|
| 3,097,019 | 7/1963 | Reidl | 303—20 |
| 3,118,707 | 1/1964 | Simmons et al. | 303—22 |
| 3,398,815 | 8/1968 | Brath et al. | 303—22 X |
| 3,398,993 | 8/1968 | Sarbach et al. | 303—20 |

DUANE A. REGER, Primary Examiner

U.S. Cl. X.R.

303—20